Oct. 13, 1925.

K. E. SCHUETZ 1,557,343

TRACTION WHEEL

Filed Aug. 26, 1924

INVENTOR.
Kuno E. Schuetz,
BY
Geo. P. Kimmel
ATTORNEY.

Patented Oct. 13, 1925.

1,557,343

UNITED STATES PATENT OFFICE.

KUNO ERNEST SCHUETZ, OF GEYSERVILLE, CALIFORNIA.

TRACTION WHEEL.

Application filed August 26, 1924. Serial No. 734,338.

*To all whom it may concern:*

Be it known that I, KUNO ERNEST SCHUETZ, a citizen of the United States, residing at Geyserville, in the county of Sonoma and State of California, have invented certain new and useful Improvements in Traction Wheels, of which the following is a specification.

This invention relates to wheels of the tractor type, and has for one of its objects to provide a wheel of this class including outstanding mud lugs, and so constructed as to be self clearing when moving over soft or muddy roads or fields, or to which the soft or moist earth will not adhere.

Another object of the invention is to provide a wheel constructed in two main separable parts, which may be readily assembled and disassembled to enable broken or impaired parts to be replaced without discarding the unimpaired parts.

Another object of the invention is to provide a wheel of this character which may be adapted without material change to traction or like vehicles of various forms of construction.

With these and other objects in view the invention consists in certain novel features of construction as hereinafter shown and described and then specifically pointed out in the claims, and in the drawings illustrative of the preferred embodiment of the invention—

Figure 1:
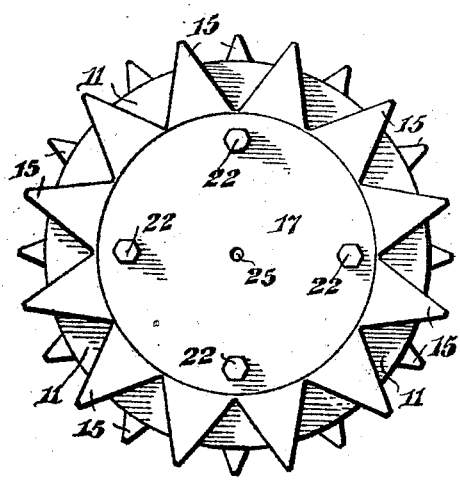
Figure 1 is a side elevation, from the outside.
Figure 2:
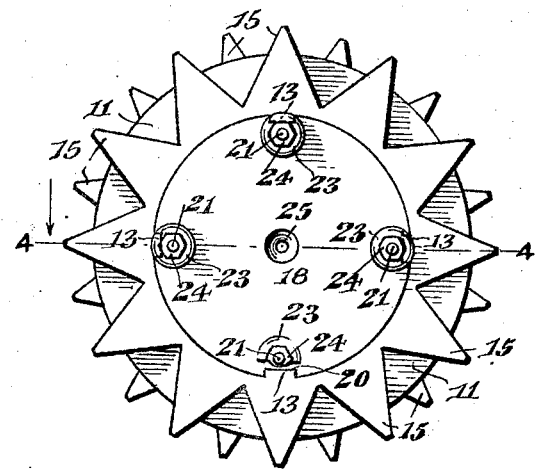
Figure 2 is a side elevation from the inside, of the improved wheel.
Figure 3:
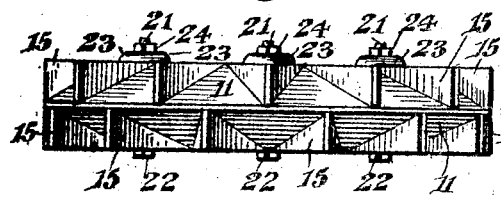
Figure 3 is a plan view of the wheel.
Figure 4:
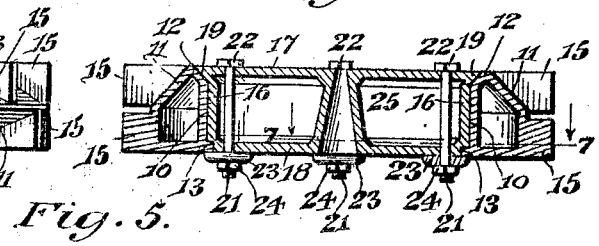
Figure 4 is a section on the line 4—4 of Figure 2.
Figure 6:
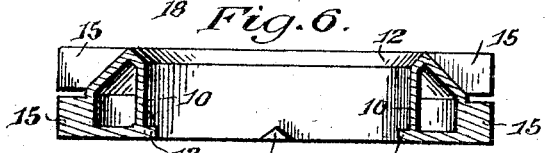
Figure 6 is a transverse section of the annular wheel or marginal portion of the wheel.
Figure 7:
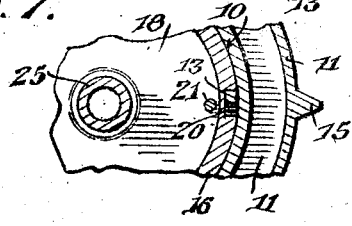
Figure 7 is a sectional detail on the line 7—7 of Figure 4.

The improved wheel comprises an annular outer or shell portion, preferably hollow as illustrated in Figures 4 and 6, with its inner wall 10 at right angles to its transverse axis, or in parallel relation to the axle of the wheel, and the outer portion V-shaped as represented at 11.

At one side the inner wall 10 is directed outwardly to form an angular seat 12, and with a plurality of V-shaped lugs 13 directed inwardly at the opposite side, as shown.

Extending outwardly from the annular shell are a plurality of V-shaped lugs 15, the lugs being arranged in staggered relation, or with the lugs at one side of the shell disposed opposite the spaces between the lugs on the other side, and with the points of all the lugs extending beyond the apex of the V-shaped margin, as shown.

The V-shaped projecting portions 15 thus form effectual mud lugs to secure the requisite grip when the vehicle is moving over the ground, and by the coacting V-shape of the margin of the shell and the V-shape of the lugs, the wheel is rendered self clearing as the constant outwardly diverging recesses produced between the lugs effectually prevent earth or other matter from adhering to the wheel.

Figure 5:
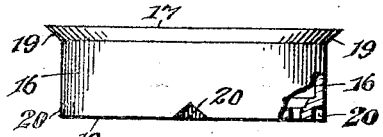
Figure 5 is a plan view, partly in section, of the filler or hub portion of the wheel.

Engaging within the circular or cylindrical interior of the shell is a cylindrical filler or hub member, preferably hollow, and comprising an outer annular margin or rim 16, outer face 17 and an inner face 18, the three parts 16, 17 and 18 being preferably integral as represented in Figures 4 and 5.

Surrounding the side 16 of the filler member is an inclined rim 19 to closely engage in the seat 12 of the shell, and formed on the margin of the side 18 of the filler member are sockets 20 to receive the lugs 13 of the shell. By this means the cylindrical space within the shell is completely filled and the filler prevented from rotation therein by the coaction of the lugs 13 and sockets 20.

A clamp bolt 21 is inserted through the filler member opposite each of the sockets 20, and provided with a head 22 at one end bearing upon the side face 17 and a relatively large washer 23 at the other end bearing over the side 18 of the filler member and the lugs 13 of the shell and held in place by clamp nuts 24. By this means the parts are firmly united and held in place.

Formed in the filler member and integral with the side walls 17 and 18 of the filler member, is a bearing 25 for the axle journal, not shown, as it forms no part of the present invention, the bearing being preferably tapered, as shown.

By this means a very compact, strong and durable wheel is produced, formed of two parts only, except the clamp bolts, and can be constructed wholly of metal, and of any required size or weight.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described my invention what I claim as new is:

1. A wheel of the class described comprising an annular shell having a margin V-shaped transversely and a plurality of V-shaped outstanding lugs extending from opposite sides of the margin and projecting at their points beyond the apex of the same, the lugs at one side being disposed opposite the spaces between the lugs at the opposite side, a filler member having an axle bearing and seated within the annular shell, and means for coupling the filler member to the shell.

2. A wheel of the class described comprising an annular shell having a margin V-shaped transversely and a plurality of V-shaped outstanding lugs extending from opposite sides of the margin and projecting at their points beyond the apex of same, the lugs at one side being disposed opposite the spaces between the lugs at the opposite side, said shell having an annular seat at one side and inwardly directed stop lugs at the other side, a filler member having an axle bearing and formed with an annular rib to engage the seat of the shell and a plurality of seats to engage the stop lugs of the shell, and means for coupling the filler member to the shell.

3. A wheel of the class described comprising an annular shell having an annular seat at one side and a plurality of spaced stop lugs at the other side, a filler member having an axle bearing and engaging in said shell and formed with an annular rib to engage the seat of said shell and a plurality of seats to receive the stop lugs of said shell.

In testimony whereof, I affix my signature hereto.

KUNO ERNEST SCHUETZ.